Sept. 13, 1966  J. H. THOMAS ETAL  3,272,359

METHOD FOR MATERIALS HANDLING

Filed April 28, 1964  2 Sheets-Sheet 1

INVENTORS
James H. Thomas and
Robert V. Burt

BY *John V. Norman*
ATTORNEY

Sept. 13, 1966   J. H. THOMAS ETAL   3,272,359
METHOD FOR MATERIALS HANDLING
Filed April 28, 1964   2 Sheets-Sheet 2
Fig. 4
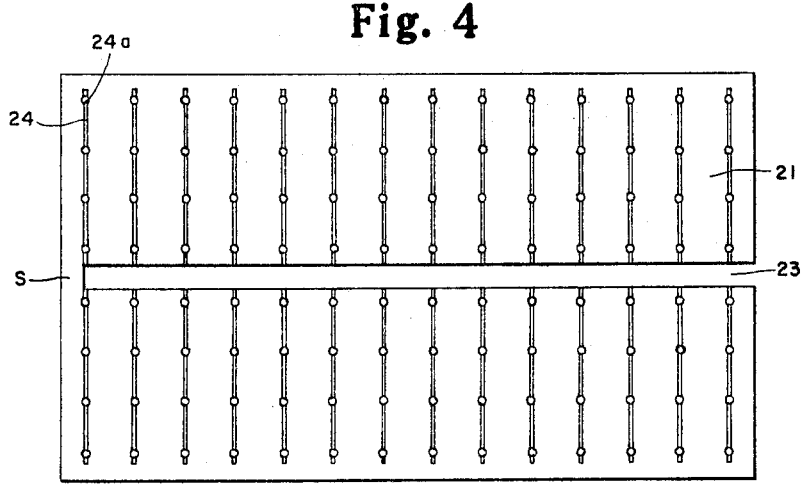
Fig. 5
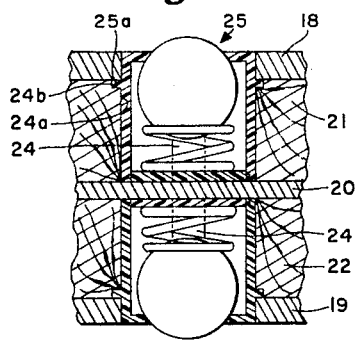
Fig. 6
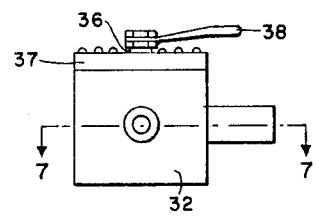
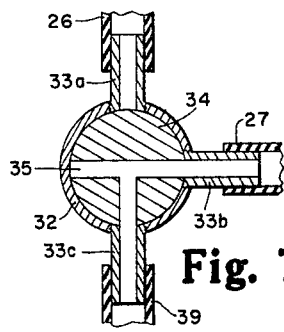
Fig. 7
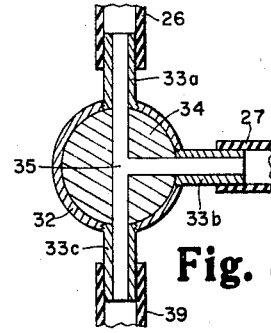
Fig. 8
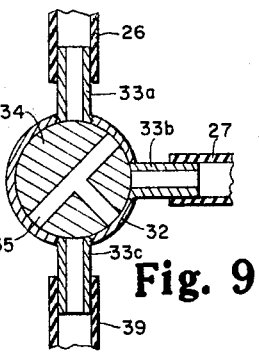
Fig. 9
INVENTORS
James H. Thomas and
Robert V. Burt
BY
ATTORNEY

United States Patent Office 3,272,359
Patented Sept. 13, 1966

3,272,359
METHOD FOR MATERIALS HANDLING
James H. Thomas, Green Township, and Robert V. Burt, Cincinnati, Ohio, assignors to The Procter & Gamble Company, Cincinnati, Ohio, a corporation of Ohio
Filed Apr. 28, 1964, Ser. No. 363,078
1 Claim. (Cl. 214—152)

This invention relates to a method and apparatus for moving pre-assembled loads into trucks and other like vehicles, and more particularly, to a pallet which utilizes an air cushion effect to move the cargo and place it directly on the floor of the vehicle, immediately freeing the pallet for use in other loading operations.

The air cushion principle, as presently used in industry, is generally associated with "single function" materials handling devices. For example, the most common form of apparatus utilizing an air cushion is an air film table which is provided on the working surface thereof with air release valves adapted to discharge air under pressure when actuated by the object to be transported thereover. As workpieces, or loads, pass directly over and actuate the valves, a pressurized air film is formed intermediate the load and the table. This air film causes the lower surface of the load and the upper surface of the work table to separate, the load being supported, and in effect lubricated, by the film of air. Due to the reduction in the coefficients of friction between the load and the work table, the load may be readily moved with the application of a relatively small amount of force.

Another form of device utilizing the air cushion principle is an air cushion pallet having an enclosed hollow interior and a bottom surface which is provided with ports or air release valves communicating with the interior. Compressed air is supplied to the interior of the pallet and flows through the ports to thereby create an air cushion thereunder, substantially as described in U.S. Patent Re. 25,045, which issued to T. K. Petersen et al. on October 3, 1961.

The prior art devices such as briefly described above are perfectly adequate for the purposes for which they are designed. However, as indicated previously, the devices are of the "single function" type, i.e., they may be fixed and operable only in one location to ease the work in moving loads along a predetermined path, portable and adapted only to move cargo to a location at which unloading must be performed, or they necessarily accompany the load which they carried in shipment. In connection with the last two points, if an air pallet was used to place a load or cargo within a vehicle, the device reduced the amount of force necessary to move the cargo into the vehicle but required hand unloading of the pallet cargo in the vehicle or, alternatively, the shipment of the pallet with the cargo. The latter alternative is economical only if the receiving dock at the cargo destination includes facilities for utilizing air pallets. Moreover, a large quantity of air pallets would be required where a substantial amount of goods is shipped continuously to a large number of destinations; the pallets occupy space which could be occupied by cargo; and the devices (because of their high unit cost) are not expendable and must eventually be returned to the shipper. Other variations of such single function devices, e.g., the provision in a vehicle of a floor incorporating a plurality of controlled air outlet ports, have been suggested. The objections to such types of apparatus are similar to those voiced above; for example, the vehicular floor can only be used in connection with a single vehicle.

It is an object of the present invention to obviate the above difficulties.

Another object of the present invention is to provide a double air cushion pallet adapted for use in the loading of vehicles without leaving any materials handling equipment or materials therein and permitting assembly of cargo within a warehouse area and substantially effortless movement thereof into loading position within a vehicle.

Briefly stated, in accordance with one aspect of this invention, there is provided a method of materials handling comprising placing cargo on a pallet having separately controlled air outlets on the upper and lower surfaces thereof, creating an air cushion under the pallet and moving the same to the location at which the cargo is to be placed, creating an air cushion between the cargo and the pallet and stripping the pallet from underneath the cargo while maintaining the cargo stationary to deposit the cargo at the location.

While the specification concludes with claims particularly pointing out and distinctly claiming the subject matter which is regarded as the present invention, it is believed that the invention will be better understood from the following description taken in connection with the accompanying drawings in which:

FIGURE 4 is a plan view of one of the air distribution layers of FIGURES 1–3;

FIGURE 5 is an enlarged fragmentary vertical sectional view showing the valve and pallet layer assembly;

FIGURE 6 is an elevational view of a form of valve adapted to be used in connection with the present invention;

FIGURE 7 is a horizontal sectional view taken along the line 7—7 of FIGURE 6 illustrating the position of the valve plug when air is to be supplied only to the lower face of the pallet;

FIGURE 8 is a horizontal sectional view similar to that of FIGURE 7 but in the position wherein air is supplied to both bottom and top pallet faces; and FIGURE 9 is a horizontal sectional view similar to that of FIGURES 7 and 8 wherein the valve is positioned so as to cut-off the air supply to both bottom and top pallet faces.

Referring to FIGURES 1–5 of the drawings, the double cushion pallet comprises a multiplicity of plies or layers of material laminated so as to form the thin, substantially flat, pallet of this invention. In describing the various elements, the terms "length" and "width" and the like are used to denote the long and short dimensions respectively of the largest face of the part on the embodiment herein described, "ends" are the terminal edges which run lengthwise and "sides" are terminal edges which extend widthwise. It will be understood, however, that the dimensions of the pallet can be varied so as to reverse the relationship thereof with the "ends" and "sides" of the pallet. In this connection, these latter two terms are used principally to indicate the orientation of the pallet with respect to the intended direction of movement thereof—the sides being parallel and the ends perpendicular to the path of movement at the time a load is deposited in a vehicle.

Figure 2:
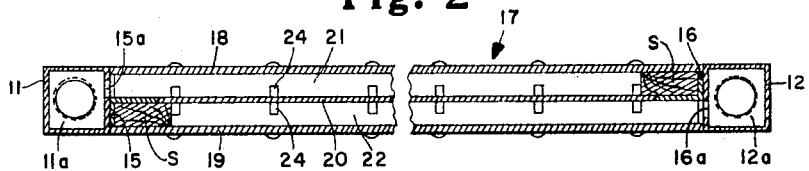
FIGURE 2 is an enlarged vertical fragmentary transverse sectional view taken along the line 2—2 of the pallet of FIGURE 1.

Inlet chambers 11 and 12, provided on the sides of the pallet, are hollow and may be constructed of a substantially rigid material such as 2" square metallic tubing, as best illustrated in FIG. 2. The ends of each of the inlet chambers are closed by means of apertured end wall plates 11a, 11b, 12a and 12b which may be welded or otherwise secured to the chamber sidewalls in airtight relationship therewith. Hose connections 13, 13', 14 and 14' are similarly mounted over the apertures in the plates 11a, 11b, 12a and 12b, the passageways therethrough in alignment and communicating directly with the interior of the inlet chambers. T irons 15 and 16 are each attached to a sidewall of chambers 11 and 12, respectively. This may be accomplished by welding, by means of fasteners such as machine screws, or other suitable devices. The top leg (flange) of each T, it will be seen, rests flush against the sidewall of the chamber to which it is attached and is preferably of such size that the sum of the flange height and the thickness of the top layer 18 and bottom layer 19 (described hereinafter) of the pallet is equal to or greater than the height of the sidewalls of the chambers 11 and 12. The other leg (stem) of each T extends away from the inlet chamber to which it is attached, toward the core 17 of the pallet structure.

The inlet chamber 11-T iron 15 assembly is slotted in the central portion hereof at 15a directly over the upper surface of the stem of the T. The slot extends through the sidewall to which the T is affixed and is the only opening in the otherwise imperforate sidewalls of the chamber 11. The purpose of this slot is to provide means of communication between the interior of chamber 11 and the header 23 distributing air to the release valves of the top face of the pallet, as will be more fully understood when taken in connection with the subsequent description. Similarly, a slot 16a is provided in the inlet chamber 12-T iron 16 assembly to place the interior of chamber 12 in communication with the header 23' (distributing air to the release valves of the bottom face of the pallet). Slot 16a is also preferably centrally located, but in a position below the stem of T 16. The size of the slots may be varied with the pressure and quantity of the air to be passed therethrough, which in turn is dependent upon the size of the pallet, type and weight of the load to be supported and other like parameters. In connection with a 1300 pound load on a 3' x 3' pallet and utilizing an air pressure which is about 3 to 5 p.s.i. gauge, a slot five-eighths inch high by two and seven-eighths inches wide is satisfactory.

The core 17 comprises a laminate of five individual layers of materials. The top and bottom layers 18 and 19 are preferably constructed of identically sized sheets of suitably abrasion-resistant material such as three-sixteenths inch thick tempered Masonite, presenting the core with smooth top and bottom surfaces. Each of the layers 18 and 19 is provided with a multiplicity of apertures arranged in a uniform pattern. While the number and spacing of the apertures may be varied with the load per unit of area to be carried by the pallet, the air pressure used, size of valves and the condition of floor on which the pallet is used, satisfactory results may be obtained where these are placed six inches on center, longitudinally and laterally.

Both the top and bottom layers 18 and 19 are preferably of sufficient width to align the ends thereof with the outer surfaces of end wall plates 11a, 12a, 11b and 12b when the pallet is assembled. The longitudinal dimension of these layers can be varied with the length of pallet desired.

The center layer 20 is also preferably constructed of Masonite or some other material which is substantially air impervious and may have a thickness matching those of the stems of the T's; for example, one-eighth of an inch. The width of the center layer is substantially the same as that of the top and bottom layers 18 and 19 and its length is approximately equal to the length of the top and bottom layers less two times the sum of the width of a T stem and the thickness of a T flange.

Interventing the top layers 18 and center layer 20 is an air distribution layer 21. Similarly, air distribution layer 22 intervenes the center layer 20 and bottom layer 19. Each of the air distribution layers may be constructed as shown in FIGURE 4 in connection with layer 21, wherein a three-quarter inch thick sheet of plywood or like material is sized in accordance with the dimensions of the core 17. The width of this layer is approximately the same as that of the top, bottom and center layers described above. The longitudinal dimensions, however, are desirably equal to the length of the top and bottom layers 18 and 19, less two times the thickness of a T flange. A header or slot 23 of a transverse cross sectional area somewhat exceeding that of slot 15a extends longitudinally along the central portion of the layer from one end to a point short of the opposite end leaving a narrow strip S interconnecting the portions of the layer to each side of the header 23. The width of strip S is greater than the width of the T stem so that the center layer 20 will contact and seal against the surface of the strip S when assembled. A multiplicity of grooves 24 extend transversely of the air distribution layer, each spaced identically with the lengthwise spacing of the apertures of top layer 18 and located so as to align therewith upon assembly. These grooves each intersect the header 23 and the ends thereof are located inwardly of the respective side edges of the air distribution layer. The grooves do not extend through the thickness of the air distribution layer and may, for example, be approximately three-eighths of an inch deep by one-quarter inch wide. Uniformly spaced along the grooves 24 are holes 24a drilled through the unslotted thickness of the air distribution layer. The holes 24a are preferably of the same diameter as the apertures of top layer 18. The dorsal side of the layer is countersunk at each hole as shown at 24b of FIGURE 5, for acceptance of the flanges of the air control valves. As indicated above, layer 22 is similar to layer 21, like reference numerals denoting like elements.

Figure 3:
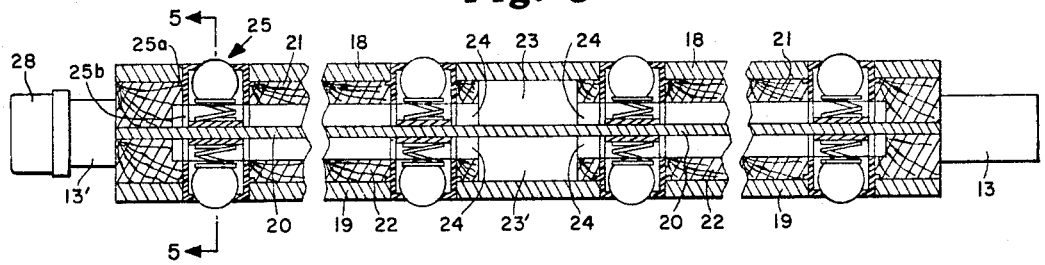
FIGURE 3 is an enlarged vertical fragmentary sectional view taken along the line 3—3 of FIGURE 1.

The pallet air control valves are forms of check valves 25 preferably incorporated on both the upper and lower working faces of the pallet. As illustrated in FIGURE 5, the check valves 25 may comprise spring-loaded solid plastic ball valves within a molded plastic housing. The particular design of the valve is not of especial importance and is well within the design capabilities of one of ordinary skill in the art. As is usual in connection with air release valves for analogous usage; the ball is urged outwardly against its seat by a spring, a small portion of the ball extending past the face of the pallet. The side wall of the valve housing is either foraminous or provided, as shown in FIGURE 3, with openings 25b positioned to align with passageways 24 in use. The valve housing may have an annular outwardly projecting flange 25a thereon of a thickness approximately the same as the depth of countersink 24b and located approximately three-sixteenths of an inch away from the top wall thereof incorporating the valve seat. This flange is adapted to seat within the countersink of the air distribution layer, as above explained, thereby placing the outer or top wall of the valve housing flush with the face of the pallet.

In assembling the pallet the center layer 20 is first sandwiched between the air distribution layers 21 and 22. The air distribution layers are oppositely oriented (rotated 180° along a transverse axis), the grooved face of each contiguous to one of the faces of the center layer 20 and with the open end of the header 23 of layer 21 and of header 23' of layer 22 at opposite ends of the center layer. Next, the check valves 25 are inserted in their respective holes 24a, with the flanges 25a thereon within the countersink 24b. After the layers are assembled and aligned lengthwise so as to centrally register center layer 20 therebetween, the top and bottom layers 18 and 19 are applied thereto. These outer layers overlap the air distribution layers 21 and 22 at each end by an amount equal to the thickness of the flange of the T irons 15 and 16. When properly assembled, the apertures of the top and bottom layers telescope over the protruding portions of the valve housing projecting outwardly from the air distribution layers, i.e., the portion thereof between the top wall and the annular flange 25a on the housing. The various layers may be secured as a unit by use of adhesives, rivets, bolts, or other suitable means, such securement serving to seal the contacting surfaces of the layers to prevent the escape of air therebetween.

The assembly made thus far leaves a T-shaped opening at each side within which the T iron members 15 and 16 may be telescoped. Following the placement of the T iron-inlet chamber assemblies at each side, the core may be attached thereto by means of rivets extending through the thickness of the core and the stem of each T iron, or alternatively by other means such as through the use of framing supports (not shown) interconnecting the ends of the inlet chambers. Regardless of the method of securement, however, the fit between the T irons and the T-shaped openings is tight enough to prevent substantial air loss in operation.

When assembled, the slot 15a of inlet chamber 11 is in direct communication with the header 23 of air distribution layer 21. Similarly, the slot 16a of inlet chamber 12 is in direct communication with header 23' of air distribution layer 22. However, due to the intervention of the central layer 20 between the air distribution layers 21 and 22 there is no communication between the headers 23 and 23' of the air distribution layers 21 and 22.

Figure 1:
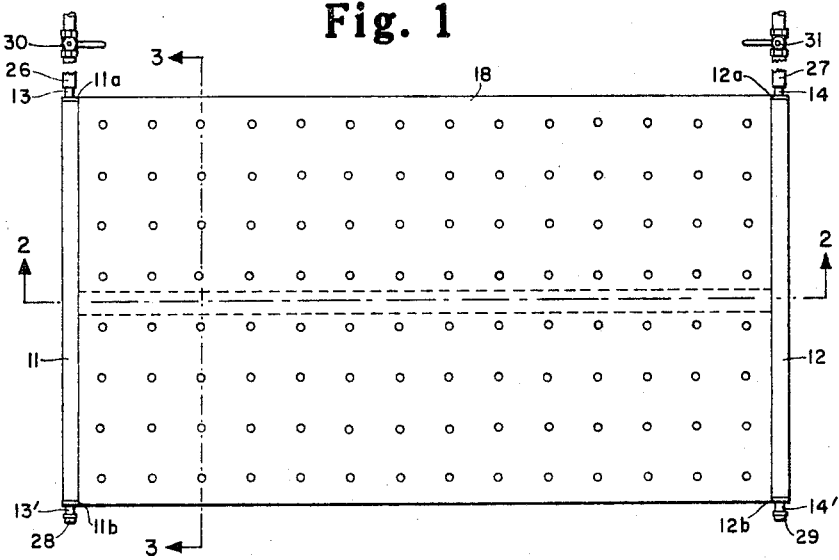
FIGURE 1 is a plan view of a preferred embodiment of the subject invention.

As shown in FIGURE 1 wherein the air pallet of this invention is adapted for use as an individual unit, a hose 26 is connected by some suitable means to the hose fitting 13 at the rearward end of inlet chamber 11, and another hose 27 is connected to the hose fitting 14 at the rearward end of inlet chamber 12, the other hose fittings 13' and 14' on the leading end of the pallet being closed by end caps 28 and 29. The hoses 26 and 27 may have separate controls for selectively placing them in communication with a source of air pressure, as by means of cock valves 30 and 31. Alternatively, such controls may be incorporated in single plug valve structures such as shown in FIGURES 6 through 9. The side elevation of FIGURE 6 and the sectional views 7–9 illustrate that such a valve may comprise a cylindrical cup-shaped housing 32 having three threaded apertures located on its periphery, one being spaced at 90° from the second, and the second at 90° from the third. A threaded fitting 33 is screwed tightly into each of the apertures, the inner end thereof failing to protrude inwardly beyond the inside surface of the sidewall of the housing 32 and the outer end projecting outwardly to facilitate hose connections thereto. A solid cylindrical plug 34 is rotatably mounted within the cavity of housing 32, the plug having an outer diameter and thickness approximately equal to the diameter and depth of the cavity. The plug 34 is provided with a T-shaped passageway 35, the top leg of which is diametrical and the other leg of which intersects the top leg in the center thereof and extends radially therefrom. The locations of the threaded apertures and of the passageway 35 are such that in assembled condition one transverse plane passes through the center lines of each. A valve stem 36 extends outwardly coaxially from one side of the plug 34, passing through an aperture in end plate 37, which encloses the plug 34 within the cavity of housing 32. A lever or handle 38 is attached to the distal end of the stem and may be used to rotate the stem 36, and thereby the plug 34, to the desired position. The hoses 26 and 27 are clamped or by other means placed in communication with fittings 33a and 33b respectively. A hose 39 extending from a source of pressurized air is similarly affixed to fitting 33c. By means of this construction the plug 34 may be rotated to assume one of three desired positions of the T-shaped passageway 35 relative to placement of the hoses 26 and 27 in communication with the air supply hose 38. If both hoses are to be pressurized, the valve is rotated until the plug is disposed as shown in FIGURE 8. This is the position in which air is supplied to the headers on each of the air distribution layers 21 and 22 to thereby activate the valves on both side of the pallet. If it is desired to merely activate the bottom valves the plug 34 may be placed in the position shown in FIGURE 7 wherein passageway 35 interconnects only the supply hose 39 and the hose 27 supplying air to the air distribution layer 22 on the bottom of the pallet. To disconnect both hoses 26 and 27 from the air supply system the valve is rotated to the position in FIGURE 9 wherein the openings of passageway 35 are not adjacent to any outlet.

In use as an individual pallet, a load can be stacked thereon while the air hoses are valved off or remain unconnected to the air supply system. Preferably a sheet of paper or other thin, substantially imperforate web is first positioned loosely on the upper surface of the pallet whereby following placement of the load thereon the paper lies intermediate the pallet and the load. The sheet should be larger than the load and, of course, must be placed on the pallet prior to the stacking thereon of the load. The purpose of the sheet is to prevent the escape of air from between adjacent ones of a plurality of containers comprising the load and consequently is an aid in producing an air cushion with a minimum of air pressure and quantity. If the load comprises a single large container or carton no sheet will be needed. Then the hose 27 is pressurized, permitting air to rush into lower air distribution system interconnecting the valves on the bottom of the pallet. Due to the weight of the cargo on the pallet, the balls of the check valves 25 on the lower or bottom pallet face are pressed upwardly by the surface of the warehouse floor and air is permitted to flow therethrough, building up the air cushion between the lower surface of the pallet and the warehouse floor. This air cushion reduces the coefficient of friction between the pallet and the floor, permitting one person to propel and guide a load of several thousand pounds.

After the pallet has been moved into the required position in the vehicle, the hose 26 is also placed in communication with the air supply system, charging air into the upper air distribution system interconnecting the valves on the top of the pallet. The load causes the valves on which it rests to remain open, forming an air cushion between the sheet of paper underlying the cargo and the top surface of the pallet, and thus placing the pallet intermediate two air cushions. Next, the cargo is held in position (as by means of hold bars or straps supported by the sidewalls of the vehicle and extending across the rearward end of the lower portion of the cargo) and the pallet stripped from thereunder and removed from the vehicle. If desired, the sheet of paper can be simultaneously withdrawn with the pallet; alternatively, the sheet can be left within the vehicle under the deposited load. As the leading edge of the pallet is withdrawn from under forward portions of the load, those portions drop to the floor. It has been found that where the thickness of the pallet is no greater than about 3" no material damage is ordinarily sustained by the cargo and that the stack of cargo fairly well maintains its unity, i.e., the portions comprising the stack do not become scattered. At the completion of the stripping operation the hold bars are removed from the vehicle and the cargo transported to its destination.

In some cases it may be desired to use a number of similar double air cushion pallets in tandem. For example, several of the pallets may be grouped together end-to-end so as to provide a string of such units having a combined length equal to that of the vehicle to be loaded. In order to assemble a group of pallets in this way, it is first necessary to remove the caps 28 and 29 from the hose connections 13' and 14'. Then short hoses are extended between corresponding hose connections of adjacent air pallets. The air pallet furthermost removed from the air supply system will have one end of the inlet chambers 11 and 12 capped similarly to those shown in FIGURE 1. Thus arranged, when air hose 27 is placed in communication with the air supply system the lower valves in each of the assembled pallets are activated, and an air cushion is built up between each of the assembled pallets and the warehouse floor, permitting the assembly to be handled readily without great effort. The load is then moved into the proper position on the vehicle, the hold bars or straps placed across the rear of the load, the top air valves activated, and the interconnected air pallets stripped from under the load in substantially the same manner as described above in connection with a single air pallet. This arrangement of a multiplicity of air pallets has the additional advantage of permitting the individual pallets to be loaded in separate locations in a warehouse and later moved together as individual pallets and assembled into the pallet string described above.

It should be understood that while the pallet has been described as containing air valves on its lower face, it would be feasible to merely use open apertures on that face. The same is not true of the upper face since in the stripping step the operating valves in the upper surface should be limited to those underlying the load at all points of time. Otherwise, loss of air through uncovered operating parts in the stripping operation would virtually eliminate the possibility of maintaining the upper air cushion. The principal advantage of using valves on the lower face is to prevent air from being lost when passing over a hole, crack or opening in the floor or between the warehouse floor and truck floor. In addition, the pallet with valves on both faces may be used, with the faces thereof oriented in any direction, either up or down, without problems arising as they would if a pallet was utilized with an open apertured face on the upper side.

It should also be understood that the pallet body may be formed in many different ways and from a variety of materials to achieve the desired selectively operated air distribution systems in the respective faces of the device. For example, the pallet could comprise a hollow metal device with separately formed passageways therein comprising the two air distribution systems. Alternatively, the pallet could be formed from a flexible material such as plastic and the like. Thus, it will be seen that many modifications of the above invention may be used and it is not intended to hereby limit it to the particular embodiments shown or described. The terms used in describing the invention are used in their descriptive sense and not as terms of limitation it being intended that all equivalents thereof be included within the scope of the appended claim.

What is claimed is:

The method of materials handling which comprises:
(A) positioning a thin, substantially imperforate web loosely on the upper surface of a pallet having air outlets on the upper and lower surfaces thereof, said outlets being separately controlled, and placing cargo to be shipped on said imperforate web, said cargo comprising a plurality of containers,
(B) connecting the lower air outlets to a source of pressurized air to thereby create an air cushion between the lower surface of the pallet and the floor,
(C) moving the loaded pallet to the required location at which the cargo is to be placed,
(D) connecting the upper air outlets to a source of pressurized air to thereby create an air cushion between the imperforate web underlying the cargo and the upper surface of the pallet while maintaining the air cushion between the lower surface of the pallet and the floor, and
(E) stripping the pallet from underneath the cargo while simultaneously maintaining said cargo in a substantially stationary position whereby said cargo is deposited at said location.

References Cited by the Examiner

UNITED STATES PATENTS 2,315,627  4/1943  Lamb _____ 214—1
2,918,183  12/1959  Petersen _____ 214—1

FOREIGN PATENTS 1,103,849  3/1961  Germany.

MARVIN A. CHAMPION, *Primary Examiner.*